(12) United States Patent
Daniels et al.

(10) Patent No.: US 12,296,640 B2
(45) Date of Patent: May 13, 2025

(54) SUSPENSION SLIDER RELEASE ASSEMBLY

(71) Applicant: SAF-HOLLAND, Inc., Muskegon, MI (US)

(72) Inventors: Bradley Robert Daniels, Fremont, MI (US); Edward Robert Hammer, Casnovia, MI (US); Jeffrey M. Galla, Norton Shores, MI (US)

(73) Assignee: SAF-Holland, Inc., Muskegon, MI (US)

( * ) Notice: Subject to any disclaimer, the term of this patent is extended or adjusted under 35 U.S.C. 154(b) by 0 days.

(21) Appl. No.: 18/420,039

(22) Filed: Jan. 23, 2024

(65) Prior Publication Data

US 2024/0278610 A1    Aug. 22, 2024

Related U.S. Application Data

(60) Provisional application No. 63/481,063, filed on Jan. 23, 2023.

(51) Int. Cl.
*B60G 7/00* (2006.01)

(52) U.S. Cl.
CPC ...... *B60G 7/001* (2013.01); *B60G 2204/4232* (2013.01); *B60G 2204/4604* (2013.01); *B60G 2300/04* (2013.01)

(58) Field of Classification Search
CPC .............. B62D 53/068; B60G 2300/04; B60G 2204/4232; B60G 7/001
USPC .......................... 280/149.2, 407.1; 180/24.02
See application file for complete search history.

(56) References Cited

U.S. PATENT DOCUMENTS

| | | | | |
|---|---|---|---|---|
| 4,838,566 A * | 6/1989 | Baxter | ................. | B62D 53/068 180/209 |
| 4,838,578 A | 6/1989 | Baxter | | |
| 5,449,187 A * | 9/1995 | Schueman | ........... | B62D 53/068 180/209 |
| 5,505,475 A * | 4/1996 | Turner | ................. | B62D 53/068 280/149.2 |
| 7,604,248 B2 * | 10/2009 | Bromley | .............. | B62D 53/068 280/407.1 |
| 10,807,427 B2 * | 10/2020 | Lin | ........................ | B60G 5/005 |
| 2007/0024017 A1 | 2/2007 | Ramsey | | |
| 2008/0106057 A1 * | 5/2008 | Smith | ................... | B62D 53/068 280/149 |
| 2023/0034135 A1 * | 2/2023 | Galazin | ................ | B62D 53/068 |

* cited by examiner

*Primary Examiner* — Paul N Dickson
*Assistant Examiner* — Caitlin Anne Miller
(74) *Attorney, Agent, or Firm* — Price Heneveld LLP

(57) ABSTRACT

A locking mechanism configured to selectively secure a vehicle slider frame assembly to a vehicle frame assembly includes a locking member configured to move between a locked position and an unlocked position, an actuator shaft operably coupled with the locking member such that turning the actuator shaft along a longitudinal axis of the actuator shaft moves the locking member between the locked and unlocked positions, the actuator shaft including a first portion and a second portion that telescopingly engage one another and are releasably secured to one another, and a spring member positioned over the actuator shaft and configured to bias the at least one locking member toward the locked position.

24 Claims, 6 Drawing Sheets

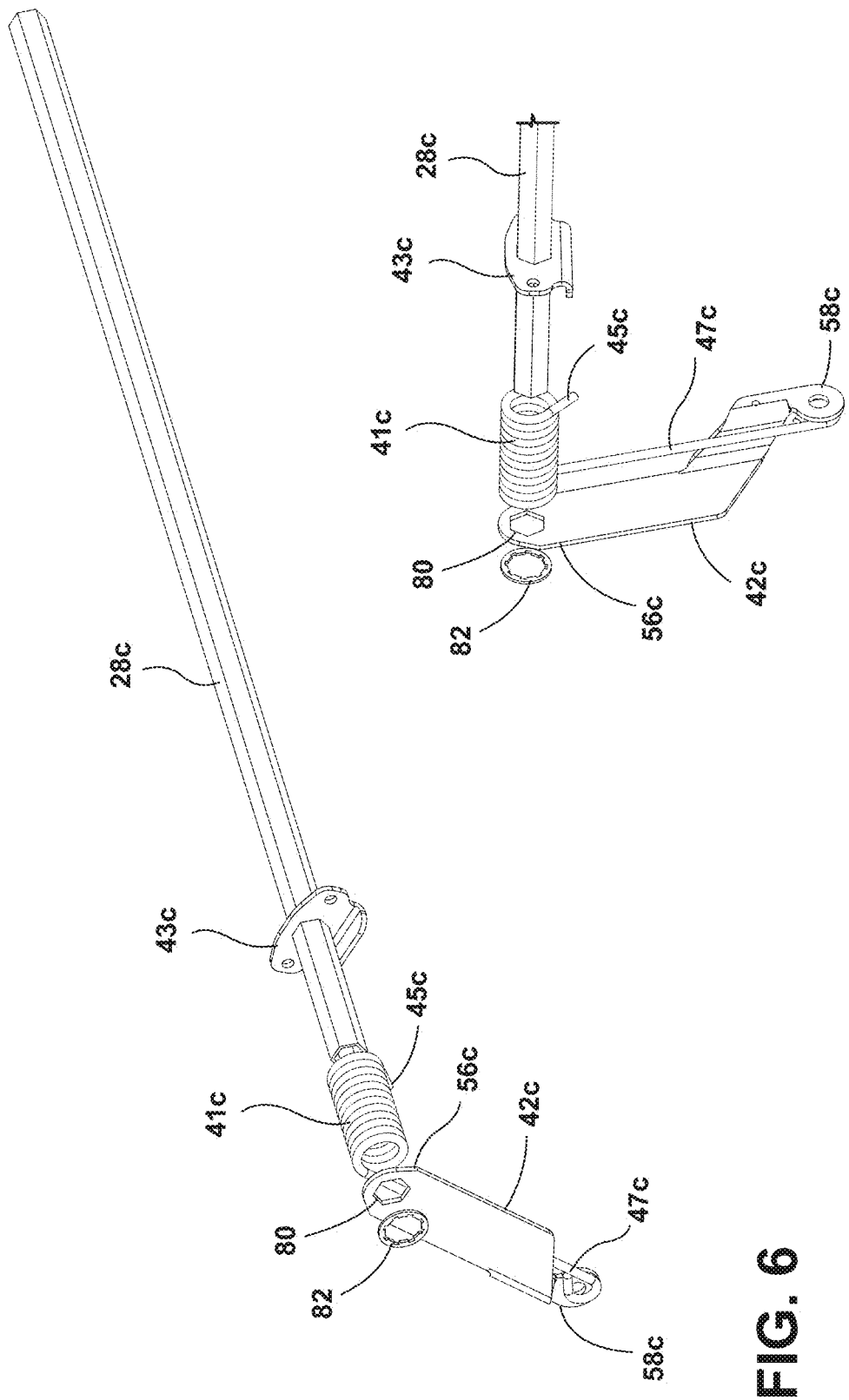

SUSPENSION SLIDER RELEASE ASSEMBLY

CROSS-REFERENCE TO RELATED APPLICATION

This application claims priority to U.S. Provisional Patent Application No. 63/481,063, entitled "SUSPENSION SLIDER RELEASE ASSEMBLY," filed Jan. 23, 2023, the entire disclosure of which is incorporated herein by reference.

BACKGROUND OF THE INVENTION

The present embodiments as disclosed herein generally include a vehicle slider suspension assembly supporting arrangement, and in particular to a vehicle slider assembly including a locking arrangement having a two-piece torsion tube or actuator shaft configured to allow coating or treating of certain components of the locking arrangement prior to assembly thereof.

BRIEF SUMMARY

One embodiment as shown and described herein includes a vehicle suspension that includes a vehicle frame assembly, and a slider assembly including a slider frame assembly adjustable along a length of the vehicle frame assembly, and a locking arrangement configured to selectively secure the slider frame assembly at a plurality of predefined positions along the length of the vehicle frame assembly. The locking arrangement includes at least one locking member movable between a locked position where the at least one locking member engages the vehicle frame assembly thereby preventing the slider frame assembly from moving along the length of the vehicle frame assembly, and an unlocked position where the at least one locking member is disengaged from the vehicle frame assembly thereby allowing the slider frame assembly to move along the length of the vehicle frame assembly between the plurality of predefined positions, an actuator shaft operably coupled with the at least one locking member such that turning the actuator shaft along a longitudinal axis of the actuator shaft moves the at least one locking member between the locked and unlocked positions, the actuator shaft including a first portion and a second portion that telescopingly engage one another and are releasably secured to one another, and a spring member positioned over the actuator shaft and configured to bias the at least one locking member toward the locked position.

Another embodiment as shown and described herein may further or alternatively include a vehicle suspension that includes a vehicle frame assembly, and a slider assembly including a slider frame assembly adjustable along a length of the vehicle frame assembly, and a locking arrangement configured to selectively secure the slider frame assembly at a plurality of predefined positions along the length of the vehicle frame assembly. The locking arrangement may include at least one locking member movable between a locked position where the at least one locking member engages the vehicle frame assembly thereby preventing the slider frame assembly from moving along the length of the vehicle frame assembly, and an unlocked position where the at least one locking member is disengaged from the vehicle frame assembly thereby allowing the slider frame assembly to move along the length of the vehicle frame assembly between the plurality of predefined positions, and an actuator shaft operably coupled with the at least one locking member such that turning the actuator shaft along a longitudinal axis of the actuator shaft moves the at least one locking member between the locked and unlocked positions, the actuator shaft having a non-circular cross-sectional configuration. The locking arrangement may further include a spring member positioned over the actuator shaft and configured to bias the at least one locking member toward the locked position, and an actuator member having a first end releasably coupled to the actuator shaft and a second end configured to receive an input to move the at least one locking member from the locked position to the unlocked position, the actuator member having an aperture the received an end of the actuator shaft where the aperture has a complimentary configuration to the non-circular cross-sectional configuration of the actuator shaft.

Yet another embodiment as shown and described herein may further or alternatively include a locking mechanism configured to selectively secure a vehicle slider frame assembly at a plurality of predefined positions along may include at least one locking member configured to move between a locked position where the at least one locking member is configured to engage the vehicle frame assembly thereby preventing the slider frame assembly from moving along the length of the vehicle frame assembly, and an unlocked position where the at least one locking member is configured to disengage from the vehicle frame assembly thereby allowing the slider frame assembly to move along the length of the vehicle frame assembly between the plurality of predefined positions, an actuator shaft operably coupled with the at least one locking member such that turning the actuator shaft along a longitudinal axis of the actuator shaft moves the at least one locking member between the locked and unlocked positions, the actuator shaft including a first portion and a second portion that telescopingly engage one another and are releasably secured to one another, and a spring member positioned over the actuator shaft and configured to bias the at least one locking member toward the locked position.

These and other features, advantages and objects of the present invention will be further understood and appreciated by those skilled in the art by reference to the following specification, claims and appended drawings.

BRIEF DESCRIPTION OF THE DRAWINGS

FIG. 6 is an exploded perspective view of a fourth embodiment of the locking arrangement; and FIG. 6A is a perspective view of the fourth embodiment.

DETAILED DESCRIPTION

Figure 1:
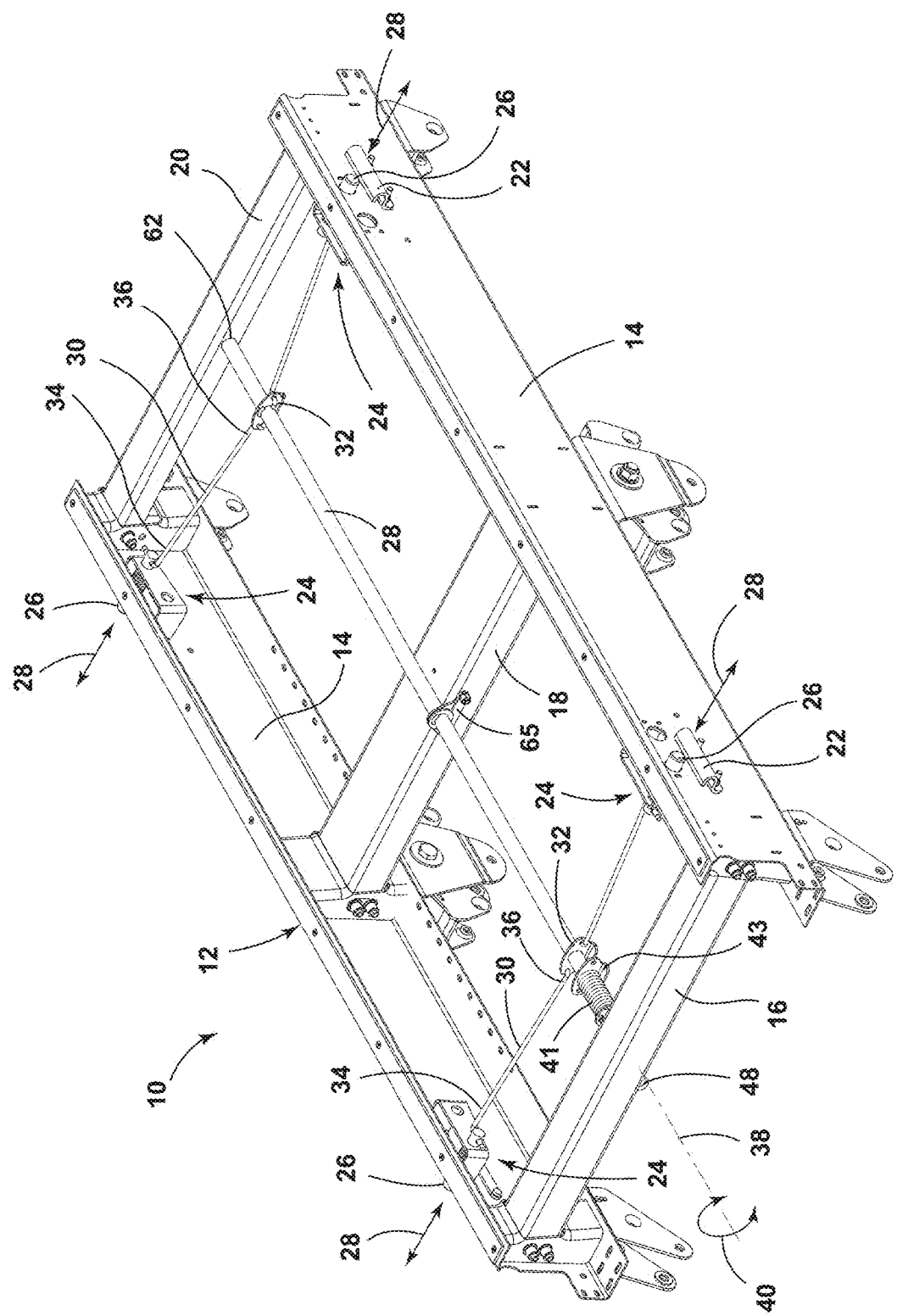
FIG. 1 is a front perspective view of a suspension slider assembly embodying the present invention.
Figure 2:
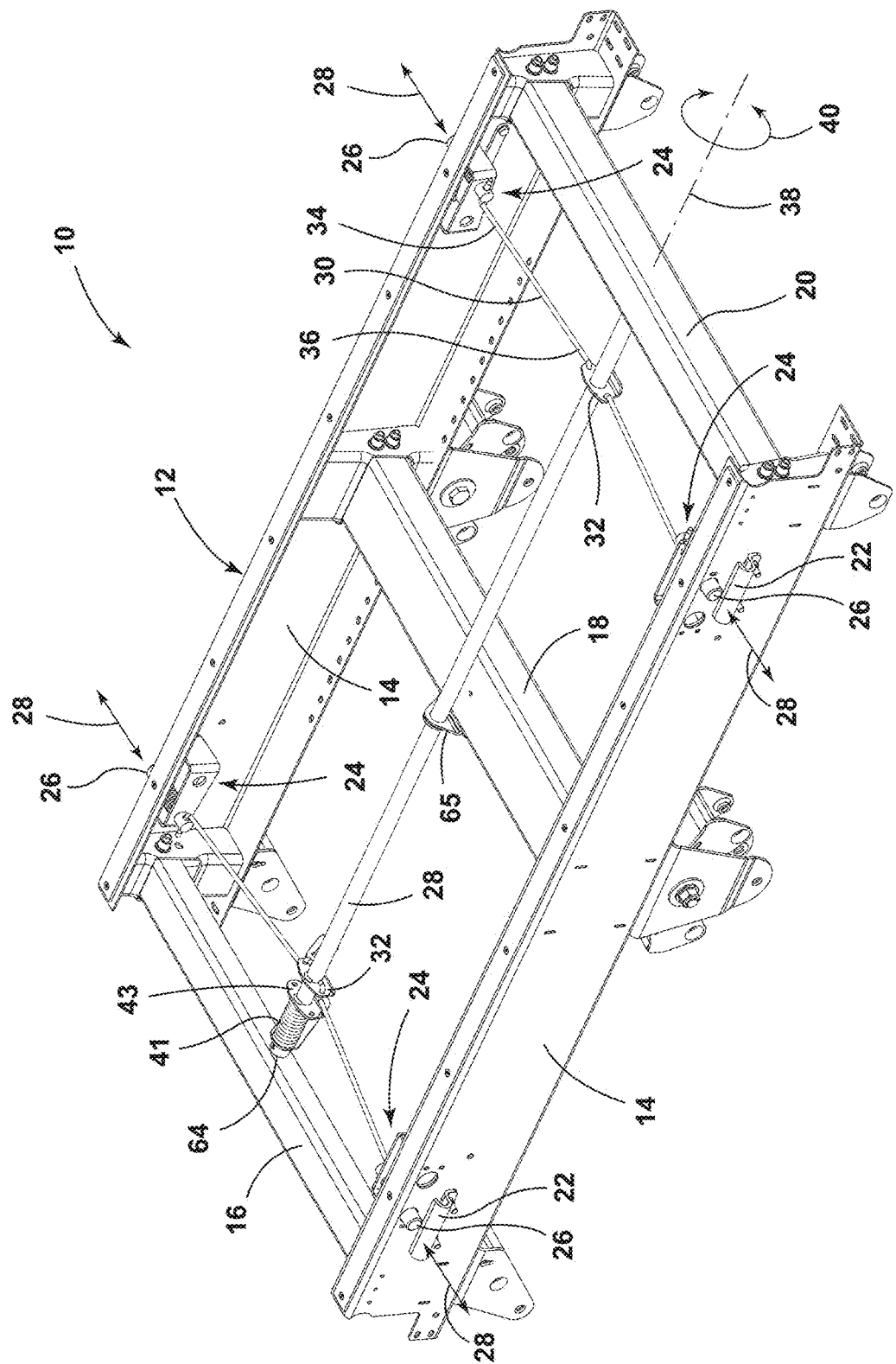
FIG. 2 is a rear perspective view of the suspension slider assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specifications, are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates a suspension slider assembly embodying the present invention. In the present example, the slider assembly 10 is configured to slidably couple to a vehicle frame assembly (not shown) of an overall vehicle arrangement, and in particular to a heavy-duty trailer assembly, and which is part of an overall vehicle suspension assembly where the suspension arrangement of the vehicle suspension, such as a trailing-arm type suspension assembly, is coupled to and supports the slider assembly 10 above a road surface.

As best illustrated in FIGS. 1 and 2, the slider assembly 10 includes a slider frame assembly 12 that includes a pair of longitudinally-extending side frame members 14 and a plurality of laterally-extending cross frame members 16, 18, 20. A plurality of slider supports 22 are positioned along the length of the side frame members 14 and are configured to slidably engage corresponding longitudinal frame members of the vehicle frame assembly in a manner known in the art such that the slider frame assembly 12 is repositionable along a length of the vehicle frame member between a plurality of predefined positions.

The slider assembly 10 further includes a locking arrangement 24 configured to releasably lock the slider assembly 10 with respect to the vehicle frame assembly at the predefined positions. The locking arrangement 24 includes a plurality of locking members or pins 26 movable in the directions 29 between a locked position where the locking members 26 engage one corresponding aperture of a plurality of apertures spaced along the length of the vehicle frame member thereby preventing the slider assembly 10 from moving or being repositioned with respect to the vehicle frame assembly, and an unlocked position where the locking members 26 are withdrawn from engagement with the apertures of the vehicle frame assembly thereby allowing the slider assembly 10 to be repositioned along the length of the vehicle frame assembly. Each of the locking members 26 are operably coupled to an actuator shaft 28 via a plurality of linkage arms 30 and cam members 32 where a first end 34 of each linkage arm 30 is pivotably coupled to an associated locking member 26, and a second end 36 of each linkage arm 30 is pivotably coupled to an associated cam member 32, and where each cam member 32 is fixedly secured to the actuator shaft 28 via welding. The actuator shaft 28, the linkage arms 30 and the locking members 26 are configured and assembled with one another such that rotation of the actuator shaft 28 about a longitudinal axis 38 of the actuator shaft 28 in the directions 40 move the locking members 26 between the locked and unlocked positions. The locking members 26 are biased from the unlocked position toward the locked position by a torsion spring member 41 positioned about the actuator shaft 28 and configured to abut the cross frame member 16 and an actuator member 42 as described below.

Figure 3:
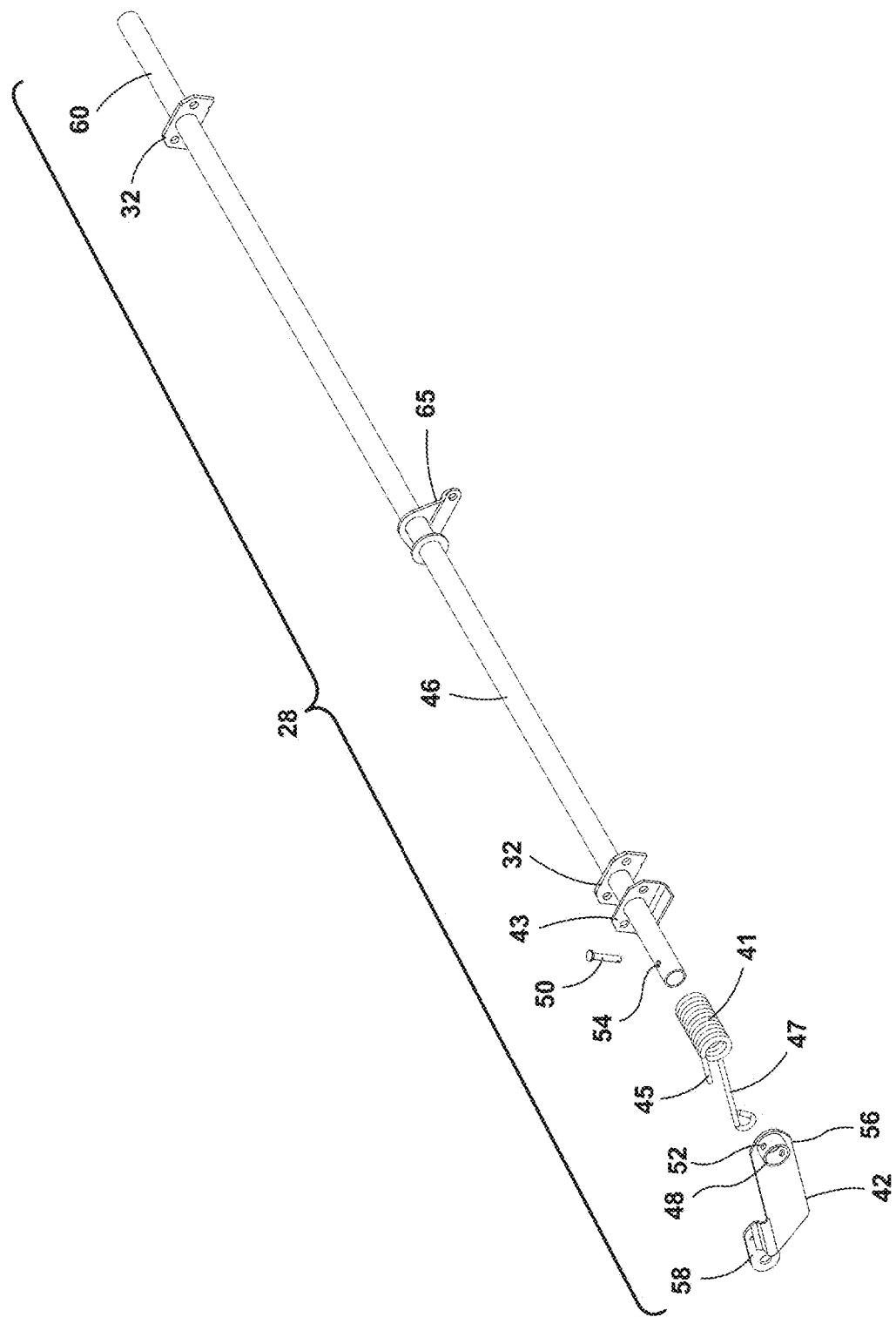
FIG. 3 is an exploded perspective view of a first embodiment of a locking arrangement.

As best illustrated in FIG. 3, a first embodiment of the actuator shaft 28 includes a first portion 46 to which the cam members 32 are secured, and a second portion 48. In the illustrated example, the first portion 46 and the second portion 48 each comprise a hollow tube having a circular cross-sectional configuration, where the second portion 48 telescopingly receives the first portion 46. In assembly, the spring member 41 is positioned over an end of the first portion 46 of the actuator shaft 28. The second portion 48 of the actuator shaft 28 is then extended over the first portion 46. A removable locking pin 50 extends through apertures 52 of the second portion 48 in a corresponding and co-aligned aperture 54 of the first portion 46. A clevis pin (not shown) engages the locking pin 50 to secure the same in place. A spring abutment member 43 is fixedly secured to the second portion 46 of the actuator shaft 28 via a weld. In assembly, an end of the spring 41 abuts the spring abutment member 43. In the illustrated example, the second portion 48 is fixed to a first end 56 of the actuator member 42 while a second end 58 of the actuator member is configured to receive a manual or mechanical input which rotates the actuator shaft 28 about the longitudinal axis 38 thereby moving the locking members 26 between the locked and unlocked positions. The spring member 41 includes a first end 45 configured to abut the cross frame member 16 and a second end 47 configured to be secured to and move with the actuator member 42. Although the second portion 48 of the actuator shaft 28 is illustrated as being welded to the actuator member 42, it is noted that the second portion 48 may be secured to the actuator member 42 via other methods, or may be formed as a separate piece from the actuator member 42. In assembly, a distal end 60 of the first portion 46 of the actuator shaft 28 is rotatably received within a corresponding aperture 62 of the cross frame member 20, while an end of the second portion 48 of the actuator shaft 28 is received within an aperture 64 of the cross frame member 16. A mounting member 66 may be used to pivotably support the actuator shaft 28 from the centrally located cross frame member 18. The arrangement as described above allows for final assembly of the arrangement after certain components thereof are coated or treated, e.g. galvanizing, painting, electroplating or electrocoating, and the like, such that certain components/elements of the arrangement may be coated or treated while other components may undergo other or alternative coating or treating methods, or may not be coated or treated in any manner.

Figure 4:
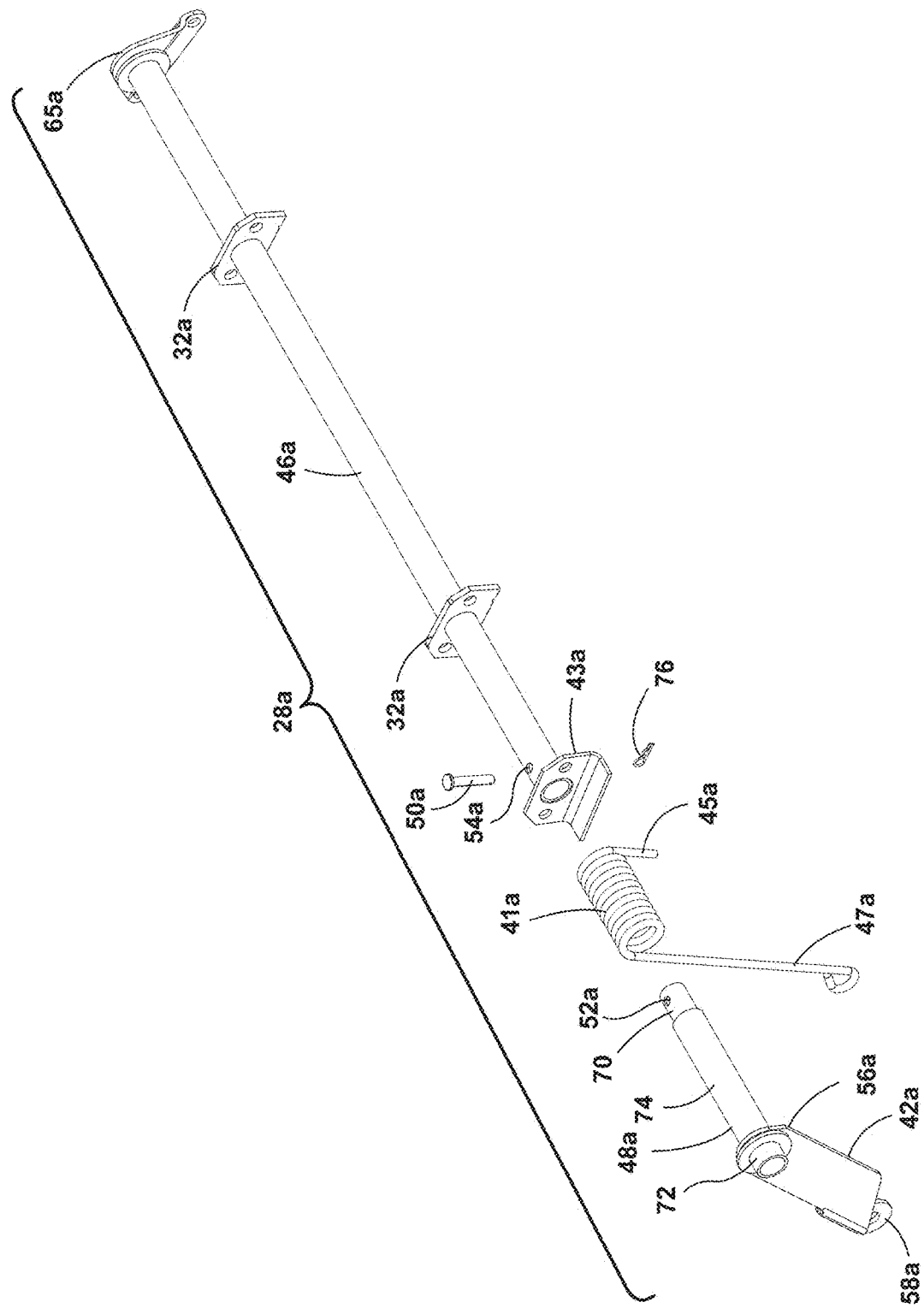
FIG. 4 is an exploded perspective view of a second embodiment of the locking arrangement.

As best illustrated in FIG. 4, another embodiment of the actuator shaft 28a includes the first portion 46a and the second portion 48a. Since the actuator shaft 28a is similar to the previously described actuator shaft 28, similar parts appearing in FIGS. 1-3 and FIG. 4, respectively are represented by the same, corresponding reference numeral, except for the suffix "a" in the numerals of the latter. In the illustrated example, the second portion 48a of the actuator shaft 28a includes a first end portion 70, a second end portion 72 opposite the first end portion 70 and a center portion 74, where the second end portion 72 and the center portion 74 have a larger diameter than the first end portion 70. The second portion 48a may be formed as a hollow tube or as a solid rod. In assembly, the spring member 43a is positioned over the center portion 74 of the second portion 48a, and the first end portion 70 of the second portion 48a is then telescopingly inserted into the first portion 46a. The locking pin 58 is then inserted into the apertures 54a and the aperture 52a and secured in place via a cotter key 76. It is noted that the second end portion 72 has a larger diameter than the center portion 74 such that the second end portion 72 can be rotatably received within the aperture 64 (FIG. 2) of the cross frame member 16 where the aperture 64 has an industry-standard diameter without requiring the use of additional bushings or adapters. The arrangement provides similar individual or selective coatings or treating methods to be applied to individual components or elements of the arrangement.

Figure 5:
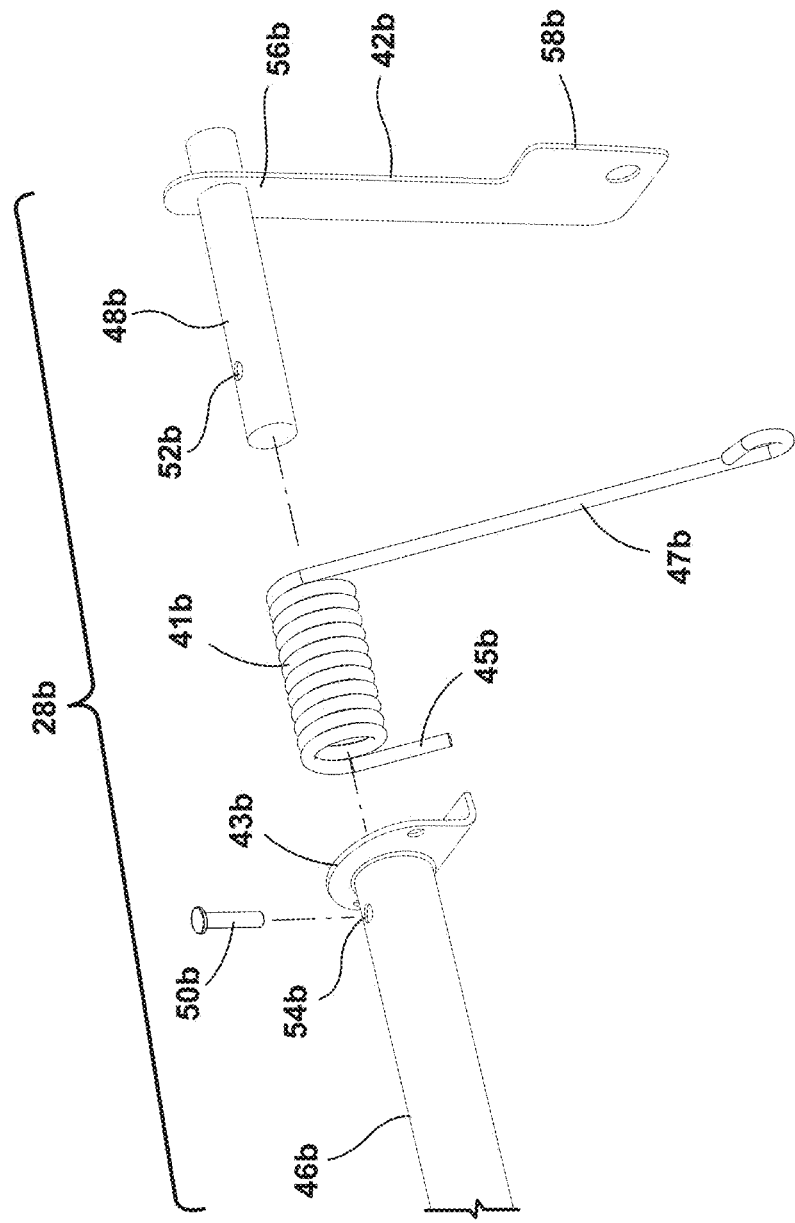
FIG. 5 is an exploded perspective view of a third embodiment of the locking arrangement.

FIG. 5 illustrates another alternative embodiment of the actuator shaft 28b. Since the actuator shaft 28b is similar to the previously described actuator shaft 28, similar parts appearing in FIGS. 1-3 and FIG. 5, respectively are presented by the same, corresponding reference numeral, except for the suffix "b" in the numerals of the latter. In the illustrated example, the second portion 48b of the actuator shaft 28b includes a single-piece solid rod. In assembly, the spring member 41b is placed over the second portion 48b, and an end of the second portion 48b is telescopingly inserted into an open end of the first portion 46b. The pin 50b is inserted through the apertures 54b and the aperture 52b, thereby securing the second portion 48b to the first portion 46b. Again, the arrangement provides similar individual or selective coatings or treating methods to be applied to individual components or elements of the arrangement.

In yet another alternative embodiment, the actuator shaft 28c is provided a non-circular cross-sectional configuration. Since the actuator shaft 28c is similar to the previously described actuator shaft 28, similar parts appearing in FIGS. 1-3 and FIG. 6, respectively are represented by the same, corresponding reference numeral, except for the suffix "c" in the numerals of the latter. In the illustrated example, the actuator shaft 28c (FIGS. 6 and 6A) is provided with a hexagonally-shaped cross-sectional configuration, although other non-circular configurations may also be utilized. In assembly, the spring member 41c is placed over an end of the actuator shaft 28c, and the end of the actuator shaft 28c is then inserted into an aperture 80 of the actuator member 42c, where the aperture 80 has a configuration that is complementary to the cross-sectional configuration of the actuator shaft 28c, and in the illustrated example, has a hexagonal shape. A spacer/locking washer 82 is then placed upon the end of the actuator shaft 28c and the overall assembly is inserted into the associated slider frame assembly 12 such that the end of the actuator shaft 28c is inserted into the aperture 64 (FIG. 2) of the cross frame member 16 such that the spring member 41c, the actuator member 42c and the washer 82 are held in position between the spring abutment member 43c and the cross frame member 64 without the use of additional fasteners. Similar to the other embodiments as discussed above, the arrangement provides similar individual or selective coatings or treating methods to be applied to individual components or elements of the arrangement.

The embodiments as described and shown herein provide an overall arrangement that can be assembled subsequent to the individual elements undergoing or being subjected to an individualized or selective coating or treatment process, where certain parts or elements within the overall arrangement require certain coating or treatments to prevent rust, oxidation, damage, etc. thereto, while other components may require alternative treatments to accomplish similar results, and/or where other components or parts cannot be subjected to certain treatments, e.g. galvanizing of spring member(s).

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle suspension, comprising:
a vehicle frame assembly; and
a slider assembly including a slider frame assembly adjustable along a length of the vehicle frame assembly, and a locking arrangement configured to selectively secure the slider frame assembly at a plurality of predefined positions along the length of the vehicle frame assembly, the locking arrangement comprising:
at least one locking member movable between a locked position where the at least one locking member engages the vehicle frame assembly thereby preventing the slider frame assembly from moving along the length of the vehicle frame assembly, and an unlocked position where the at least one locking member is disengaged from the vehicle frame assembly thereby allowing the slider frame assembly to move along the length of the vehicle frame assembly between the plurality of predefined positions;
an actuator shaft operably coupled with the at least one locking member such that turning the actuator shaft along a longitudinal axis of the actuator shaft moves the at least one locking member between the locked and unlocked positions, the actuator shaft including a first portion and a second portion that telescopingly engage one another and are releasably secured to one another; and
a spring member positioned over the actuator shaft and configured to bias the at least one locking member toward the locked position.

2. The vehicle suspension of claim 1, wherein the first and second portions of the actuator shaft are releasably secured to one another via a removable pin member extending through the first and second portions of the actuator.

3. The vehicle suspension of claim 1, wherein the first portion of the actuator shaft comprises a tube.

4. The vehicle suspension of claim 3, where the second portion of the actuator shaft comprises a tube.

5. The vehicle suspension of claim 3, wherein the second portion of the actuator shaft comprises a solid rod.

6. The vehicle suspension of claim 1, wherein the locking arrangement further comprises an actuator member having a first end coupled to the second portion of the actuator shaft and a second end configured to receive an input to move the at least one locking member from the locked position to the unlocked position.

7. The vehicle suspension of claim 6, wherein the actuator member is welded to the second portion of the actuator shaft.

8. The vehicle suspension of claim 6, wherein a spring abutment member is secured to the first portion of the actuator shaft, and wherein the spring is secured at a position between the actuator member and the spring abutment member.

9. The vehicle suspension of claim 6, wherein the second portion of the actuator shaft telescopingly receives the first portion of the actuator shaft.

10. The vehicle suspension of claim 1, wherein the actuator shaft is galvanized, and wherein the spring member is not galvanized.

11. A vehicle suspension, comprising:
a vehicle frame assembly; and
a slider assembly including a slider frame assembly adjustable along a length of the vehicle frame assembly, and a locking arrangement configured to selectively secure the slider frame assembly at a plurality of predefined positions along the length of the vehicle frame assembly, the locking arrangement comprising:
at least one locking member movable between a locked position where the at least one locking member engages the vehicle frame assembly thereby preventing the slider frame assembly from moving along the length of the vehicle frame assembly, and an unlocked position where the at least one locking member is disengaged from the vehicle frame assembly thereby allowing the slider frame assembly to move along the length of the vehicle frame assembly between the plurality of predefined positions;

an actuator shaft operably coupled with the at least one locking member such that turning the actuator shaft along a longitudinal axis of the actuator shaft moves the at least one locking member between the locked and unlocked positions, the actuator shaft having a non-circular cross-sectional configuration;

a spring member positioned over the actuator shaft and configured to bias the at least one locking member toward the locked position; and an actuator member having a first end releasably coupled to the actuator shaft and a second end configured to receive an input to move the at least one locking member from the locked position to the unlocked position, the actuator member having an aperture that receives an end of the actuator shaft where the aperture has a complimentary configuration to the non-circular cross-sectional configuration of the actuator shaft.

12. The vehicle suspension of claim 11, wherein the non-circular cross-sectional configuration of actuator shaft is hexagonally-shaped.

13. The vehicle suspension of claim 11, wherein the actuator shaft comprises a tube.

14. The vehicle suspension of claim 11, wherein a spring abutment member is secured to the actuator shaft, and wherein the spring is secured at a position between the actuator member and the spring abutment member.

15. The vehicle suspension of claim 14, wherein the first end the actuator shaft is pivotably received within an aperture of a cross frame member of the slider frame assembly.

16. The vehicle suspension of claim 11, wherein the actuator shaft is galvanized, and wherein the spring member is not galvanized.

17. A locking mechanism configured to selectively secure a vehicle slider frame assembly at a plurality of predefined positions along the length of a vehicle frame assembly, the locking arrangement comprising:

at least one locking member configured to move between a locked position where the at least one locking member is configured to engage the vehicle frame assembly thereby preventing the slider frame assembly from moving along the length of the vehicle frame assembly, and an unlocked position where the at least one locking member is configured to disengage from the vehicle frame assembly thereby allowing the slider frame assembly to move along the length of the vehicle frame assembly between the plurality of predefined positions;

an actuator shaft operably coupled with the at least one locking member such that turning the actuator shaft along a longitudinal axis of the actuator shaft moves the at least one locking member between the locked and unlocked positions, the actuator shaft including a first portion and a second portion that telescopingly engage one another and are releasably secured to one another; and a spring member positioned over the actuator shaft and configured to bias the at least one locking member toward the locked position.

18. The locking mechanism of claim 17, wherein the first and second portions of the actuator shaft are releasably secured to one another via a removable pin member extending through the first and second portions of the actuator.

19. The locking mechanism of claim 17, wherein the first portion of the actuator shaft comprises a tube.

20. The locking mechanism of claim 17, where the second portion of the actuator shaft comprises a tube.

21. The locking mechanism of claim 17, wherein the locking arrangement further comprises an actuator member having a first end coupled to the second portion of the actuator shaft and a second end configured to receive an input to move the at least one locking member from the locked position to the unlocked position.

22. The locking mechanism of claim 21, wherein a spring abutment member is secured to the first portion of the actuator shaft, and wherein the spring is secured at a position between the actuator member and the spring abutment member.

23. The locking mechanism of claim 21, wherein the first portion of the actuator shaft telescopingly receives the second portion of the actuator shaft.

24. The vehicle suspension of claim 17, wherein the actuator shaft is galvanized, and wherein the spring member is not galvanized.

* * * * *